(12) United States Patent
McCalley et al.

(10) Patent No.: US 11,249,338 B2
(45) Date of Patent: Feb. 15, 2022

(54) FLEXIBLE TO RIGID INTEGRATED LAMINATOR

(71) Applicant: Rockwell Collins, Inc., Cedar Rapids, IA (US)

(72) Inventors: Cameron T. McCalley, Marion, IA (US); James D. Sampica, Anamosa, IA (US); Ryan N. Klaassen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 170 days.

(21) Appl. No.: 16/504,466

(22) Filed: Jul. 8, 2019

(65) Prior Publication Data
US 2021/0011334 A1    Jan. 14, 2021

(51) Int. Cl.
| | | |
|---|---|---|
| G02F 1/1335 | (2006.01) | |
| G02F 1/13 | (2006.01) | |
| B32B 37/00 | (2006.01) | |
| B32B 38/00 | (2006.01) | |
| B65B 61/06 | (2006.01) | |

(52) U.S. Cl.
CPC .... *G02F 1/133528* (2013.01); *B32B 38/0004* (2013.01); *B65B 61/06* (2013.01); *G02F 1/1303* (2013.01); *B32B 2457/202* (2013.01)

(58) Field of Classification Search
CPC ..... B32B 37/10; B32B 41/00; B32B 37/0046; B32B 2457/202; G02F 1/1303; G02F 1/133528
See application file for complete search history.

(56) References Cited

U.S. PATENT DOCUMENTS

| | | | |
|---|---|---|---|
| 10,464,297 B2 * | 11/2019 | Chen | ................... B32B 37/0053 |
| 2009/0145558 A1 * | 6/2009 | Saluz | ................... B65C 9/1803 |
| | | | 156/530 |
| 2012/0003064 A1 * | 1/2012 | Voser | ................ H01L 21/67201 |
| | | | 414/217 |

* cited by examiner

*Primary Examiner* — Mark A Osele
*Assistant Examiner* — Christopher C Caillouet
(74) *Attorney, Agent, or Firm* — Suiter Swantz pc llo (57) ABSTRACT

A laminating machine and process for applying an optically clear adhesive film to a glass substrate includes a porous belt assembly with a plurality of vacuum pumps. The vacuum pumps define different, separately adjustable vacuum zones on the surface of the porous belt. The porous belt is driven linearly so that an optically clear adhesive does not move relative to the porous belt, but does move relative to the table, allowing the adhesive to be controlled to a compressive, neutral, or tensile state while being nip-rolled to the substrate. Since there is no motion of the film relative to the belt, scratching, stretch elongation, dimensional errors, and other slip induced damage is eliminated.

8 Claims, 9 Drawing Sheets

FIG.7

FLEXIBLE TO RIGID INTEGRATED LAMINATOR

BACKGROUND

Direct dry film lamination uses polarizer film lamination systems to apply optically clear adhesive (OCA) to glass and liquid crystal displays (LCDs) as a preparatory step for vacuum and pressure steps. Polarizer film lamination systems are not designed for thick and compliant materials such as OCA, for direct contact with fragile surface films, or for devices that are very sensitive to non-uniform surface loads (for example LCDs and resistive touchscreens). Compliant materials are stretched out of specified dimensions, fragile surfaces can be scratched, and sensitive devices can be damaged or permanently deformed. Thin substrates can be stressed during OCA application, even fracturing when released from the vacuum table. Existing systems are also not designed for state flexible displays with direct roll-to-rigid lamination.

Existing solutions are directed to adjusting the polarizer laminator, manually setting up for special needs with "band-aid" fixes such as extra strips of material for leading edge nips, fixing gel strips to the vacuum table to control nip force, not roll laminating certain items such as microsheet glass and resistive touchscreen fronts, and under-sizing OCA in the roll direction to compensate for dimensional change due to stretching. All these solutions leave internal stress in the display stack which can deform the finished device, and can require several trials to identify necessary mechanical settings.

Film laminators used in display manufacturing hold the substrate in place with vacuum. Flexible films are manually aligned to mechanical datums. Once the flexible material is located, vacuum is used to hold it in place while the datums are retracted. When the process is applied to OCA, depending on the thickness of the OCA and operator force, the adhesive edge sticks to the datums and skews the material. With both items loaded on the tables, the rigid substrate table flips and the flexible material table translates under the rigid substrate table and positions itself to nip and roll the flexible material to the rigid substrate. The table tilts and a roller extends up to pinch the flexible material against the rigid substrate, then translates so that the flexible material is pulled up the flexible vacuum table, past the roller, being pressed onto the rigid substrate.

Because of the vertical pressure in the nip/crush at the lamination start, very sensitive LCD cells can be damaged in the process, or the OCA can be permanently deformed, creating a crush zone that may cause defects at the vacuum press step. The tension involved in rolling the flexible material causes problems if pressure sensitive adhesive (PSA) or films are rolled to the front of resistive touchscreens as the top sheet forms a "wave" that is locked in and causes a short such that the touchscreen is unusable. Such processes are operable for thin film lamination (less than 0.010 inches or about 0.25 millimeters), but are not for thick materials.

SUMMARY

In one aspect, embodiments of the inventive concepts disclosed herein are directed to a laminating machine and process for applying an optically clear adhesive film to a rigid substrate. The laminating machine includes a porous belt assembly with a plurality of vacuum zones. The vacuum zones define different, separately adjustable areas on the surface of the porous belt. The porous belt is driven linearly so that the OCA does not move relative to the porous belt, but does move relative to the table, allowing the OCA to be controlled to a compressive, neutral, or tensile state while being nip-rolled to the substrate. Since there is no motion of the film relative to the belt, scratching, stretch elongation, dimensional errors, and other slip induced damage is eliminated.

In a further aspect, one or more cameras may be used to locate the OCA on the surface of the porous belt so that a processor may adjust the vacuum zones holding the OCA. Such cameras may be used with robotic datum-less alignment and robotic liner peel-to-expose adhesive.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a lamination apparatus having a porous belt over a vacuum table holding the flexible film.

Figure 1A:
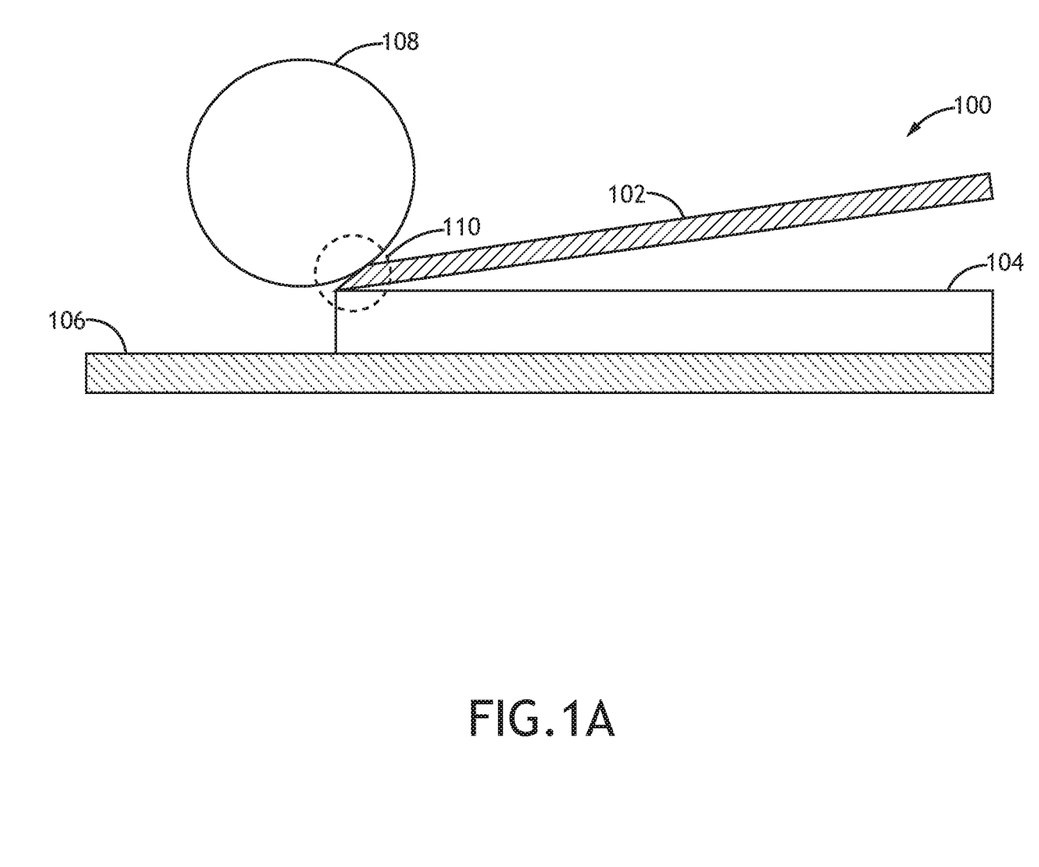
FIG. 1A shows a side view of a block representation of a lamination process.
Figure 1B:
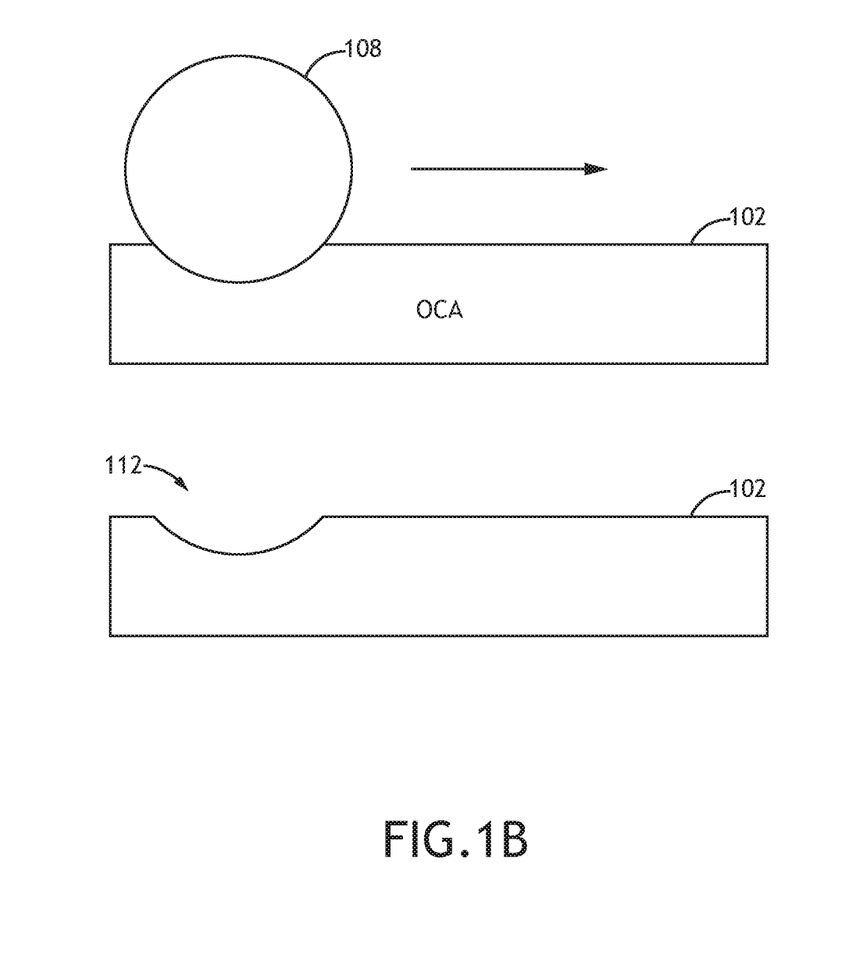
FIG. 1B shows a side view of a block representation of a lamination process.

Referring to FIGS. 1A-1B, side views of block representations 100 of a lamination process are shown. Where a film layer 102 such as an optically clear adhesive is being applied to a substrate 104, the substrate 104 is held in place on an operation table 106. The film layer 102 is pressed to the substrate 104 by a roller 108. During the pressing, the film layer 102 may be deformed 110, stretched, or otherwise have defects introduced; for example, a crush defect 112 may be introduced in the film 102 which could compromise the film or introduce effects in later process steps. In addition, the substrate 104 may be damaged, especially at either a distal or proximal end during the beginning or end of the pressing process.

Figure 2:
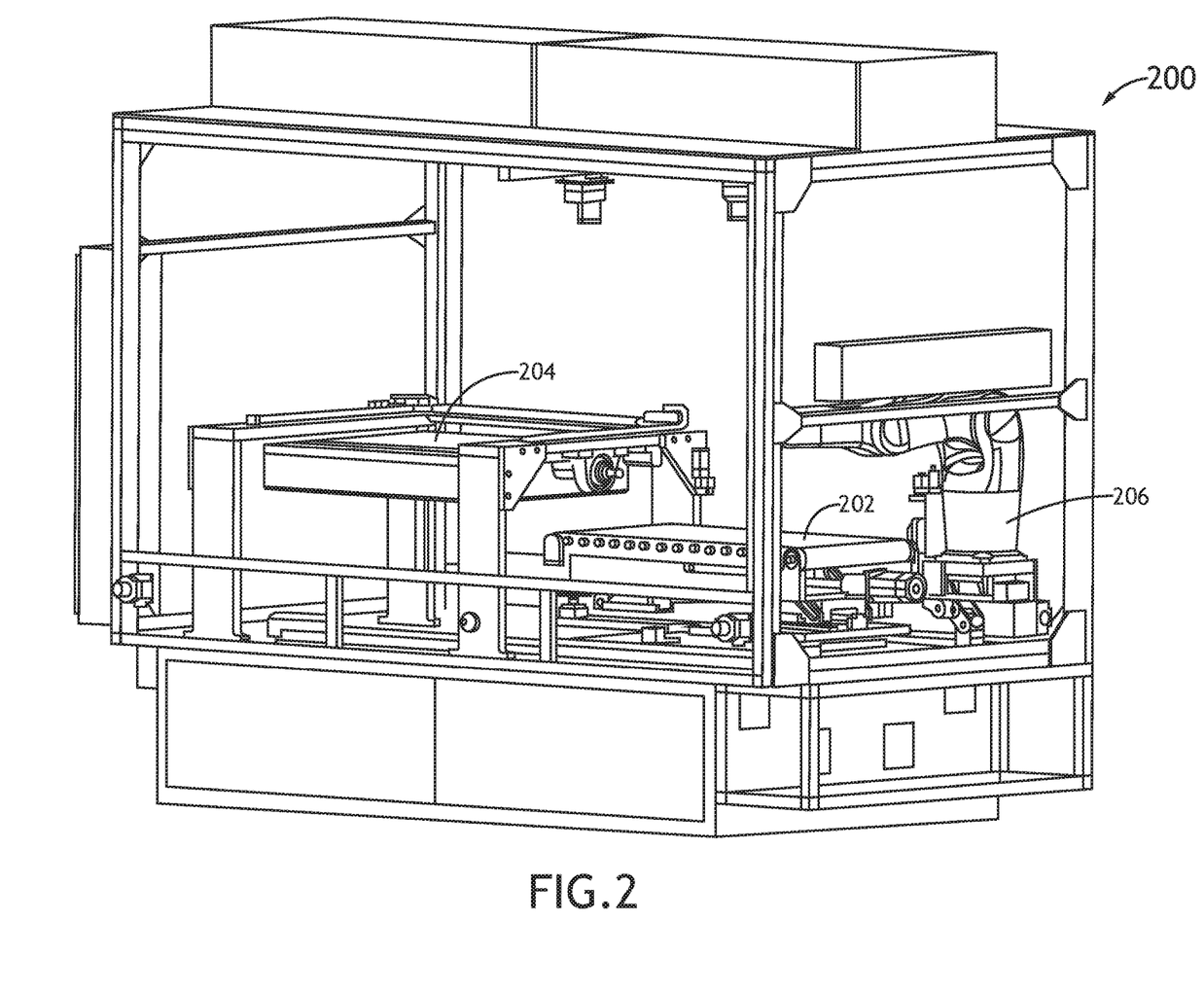
FIG. 2 shows a perspective environmental view of a laminating machine according to an exemplary embodiment.

Referring to FIG. 2, a perspective environmental view of a laminating machine 200 according to an exemplary embodiment is shown. The laminating machine 200 includes a film belt assembly 202 configured to hold a film such as an optically clear adhesive and an operation table 204 configured to hold a substrate such as glass layer. The operation table 204 may include mechanical datums for positioning the substrate, and which, in at least one embodiment, provide surfaces corresponding to the beginning and/or ending of a roller pressing process so as to minimize forces applied to the more fragile edges of the substrate.

The film belt assembly 202 includes vacuum zones that hold a film to a porous belt, driven by the film belt assembly 202. The porous belt may be Teflon coated. Rollers beneath the porous belt apply a pressure to the film sufficient to adhere the film to a substrate, but not concentrated at the edges where pressure may cause damage to the substrate, or of a magnitude to stretch and deform the film.

It may be appreciated that the film may comprise a flexible OLED or uLED film, an optically clear adhesive, a polarizer, a diffuser, ultra-thin glass (microsheet), or other similar film. It may be further appreciated that the rigid substrate may be a rigid cover glass, liquid crystal display, or other thin rigid substrate.

In at least one embodiment, an ionized air knife automatically performs a final dust blow-off.

In at least one embodiment, the laminating machine 200 comprises a robotic arm 206 and one or more cameras. The robotic arm 206 and cameras may be used to locate the substrate and film with respect to datums on the film belt assembly 202 and operation table 204 and automatically peel and dispose of a liner on film adhesives. In at least one embodiment, the robotic arm 206 may comprise a 6-axis robot.

Figure 3A:
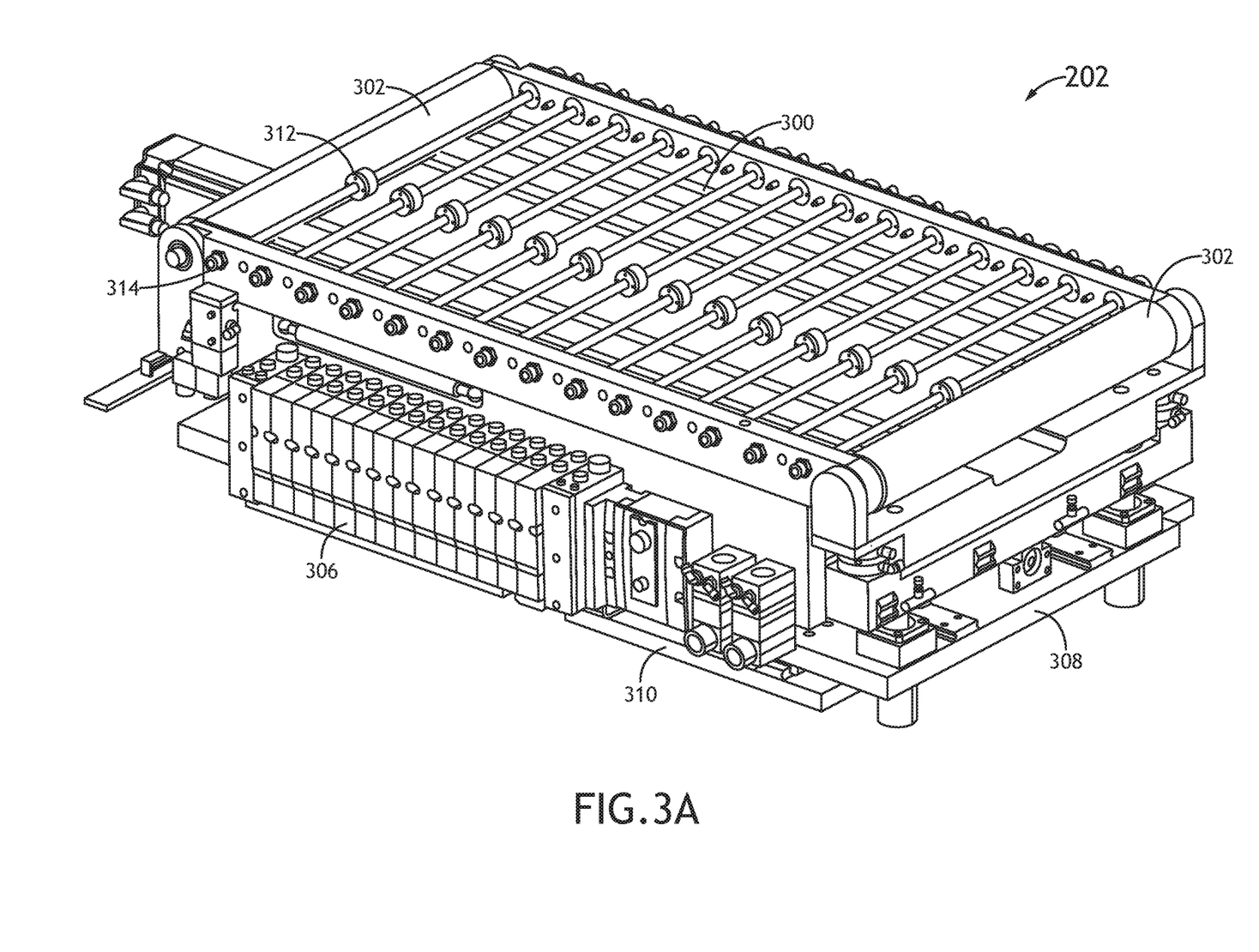
FIG. 3A shows a perspective view of a film belt assembly of a laminating machine according to an exemplary embodiment.
Figure 3B:
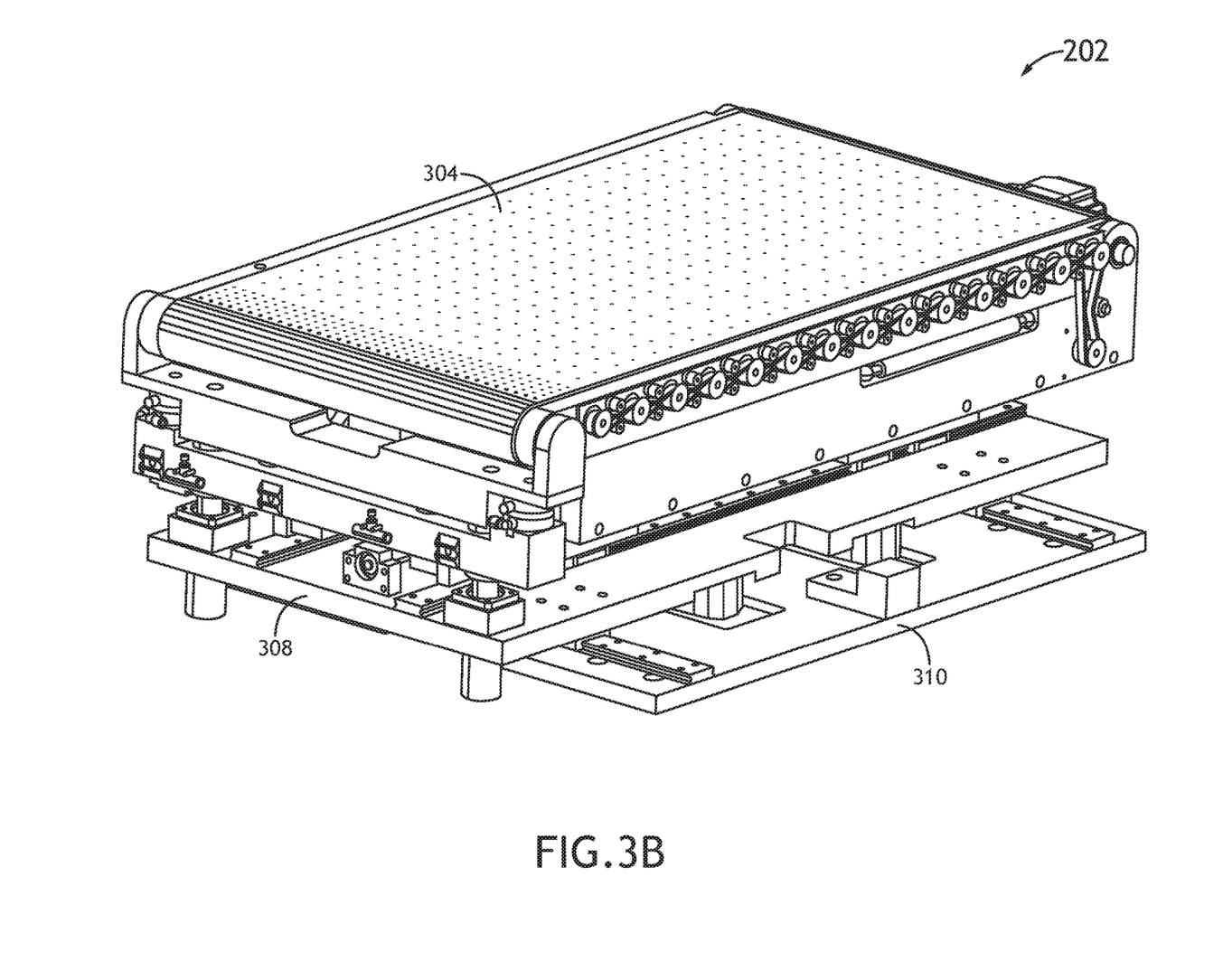
FIG. 3B shows a perspective view of a film belt assembly of a laminating machine according to an exemplary embodiment.

Referring to FIGS. 3A-3B, perspective views of a film belt assembly 202 of a laminating machine according to an exemplary embodiment are shown. The film belt assembly 202 includes a vacuum table 300 that defines a plurality of vacuum zones; each independently assignable and controllable. The top surface of the vacuum table may comprise a low friction surface. Rollers 302 disposed at distal and proximal ends of the vacuum table 300 drive a porous belt 304 configured to hold a film for application to a substrate.

The motion of the porous belt 304 and the film belt assembly 202 are coordinated during a lamination process such that the shear force of the film on the rigid substrate can be controlled to be in tension, neutral, or in compression by moving the porous belt 304 at a lower or higher speed than the translation of the film belt assembly 202 allowing stress free lamination of optically clear adhesives to microsheet substrates, and lamination of such element to a resistive touchscreen with no additional processing required.

In at least one embodiment, the porous belt 304 operates to create a sufficient seal between the vacuum table 300 and film to retain the film at a desired location on the porous belt 304, even as the porous belt 304 moves along the vacuum table 300. Because of the independently controllable vacuum zones of the vacuum table 300, different portions of the film may be under different vacuum pressure as the porous belt 304 moves or as the lamination process progresses; for example, an unadhered portion of the film may be under negative pressure to adhere to the porous belt 304 while an adhered portion may be under neutral pressure. Furthermore, a rolling zone of positive pressure may be used to press the film to the substrate.

In at least one embodiment, the film belt assembly 202 comprises a manifold valve assembly 306 for switching and adjusting vacuum pressure to the independently adjustable zones. The independently adjustable vacuum zones may be configurable with product specific recipe settings. In at least one embodiment, there are fourteen zones controlled by the manifold valve assembly 306. Blocking plugs 312, internal to a vacuum plate that abuts the porous belt 304, are positioned by lead screws 314 that move in unison that can be set to the exact flexible material's width. Adjusting the blocking plugs 312 eliminates the need for manually masking the table for specific products and allows for a variety of sizes.

In at least one embodiment, the film belt assembly 202 comprises positioning elements 308, 310 for orienting the film belt assembly 202 with respect to an operation table with a substrate once the film is positioned and ready for application. For example, a first positioning element 308 may move the film belt assembly 202 beneath the operation table while a second positioning element 310 may position the film belt assembly 202 laterally so that the film location corresponds to the substrate location of the operation table.

In at least one embodiment, the film belt assembly 202 may include attachment points for securing mechanical datums, relatively stationary with respect to the film belt assembly, but separate from the porous belt 304.

Figure 4:
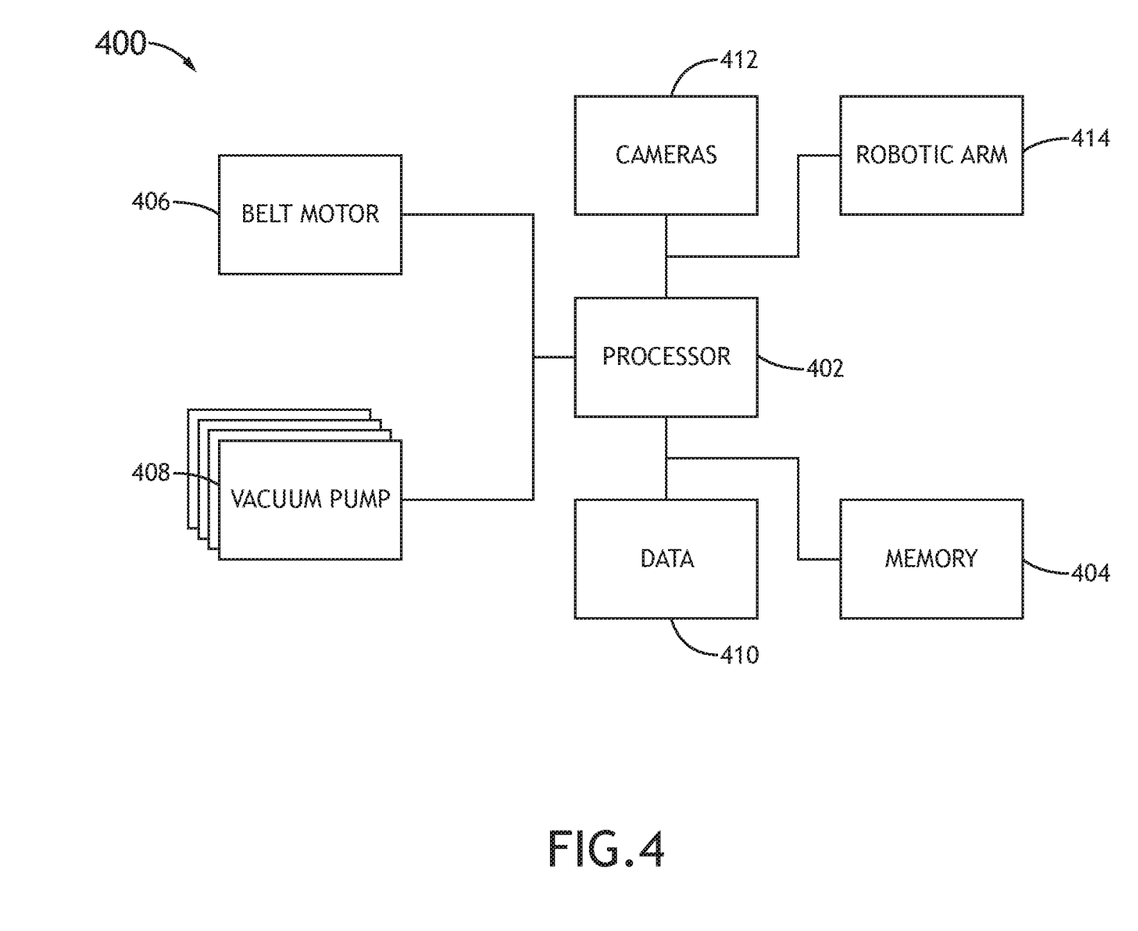
FIG. 4 shows a block diagram of a system for laminating a substrate according to an exemplary embodiment.

Referring to FIG. 4, a block diagram of a system 400 for laminating a substrate according to an exemplary embodiment is shown. The system 400 includes a processor 402, memory 404 connected to the processor 402 for storing non-transitory code, a belt motor 406 (or controller for controlling a belt motor 406) connected to the processor 402, and one or more vacuum pumps 408 (or a controller for controlling one or more vacuum pumps 408) connected to the processor 402. In at least one embodiment, the system 400 also includes one or more linear actuators or controllers connected to the processor for adjusting the position of a system including the belt motor 406.

During a lamination or adhesion process, the processor 402 activates one or more of the one or more vacuum pumps 408 to establish a vacuum zone to hold a film layer on a porous belt through negative pressure or substantially neutral pressure. The belt motor 406 moves the film linearly, potentially in conjunction with one or more linear actuators, to maintain a relative position of an adhering interface of the film and the corresponding substrate while an adhesive protecting film is removed. Rollers of a belt assembly may also apply a force to the film to facilitate adhesion. In at least one embodiment, the processor 402 drives the belt motor and linear actuators at different speeds which may result in tension, compression, or neutral stress with no stretching in the film (and underlying substrate).

In at least one embodiment, a data storage element 410 connected to the processor 402 may store data necessary for smoothly adjusting pressure in one or more vacuum zones via modifying the operation of the one or more vacuum pumps 408 or a manifold that redistributes pressure differentials. The data storage element 410 may include profiles for lamination processes corresponding to desirable motions of the porous belt and linear actuators, and pressure differentials generated in one or more vacuum zones.

The one or more vacuum zones may be independently adjustable, and sufficiently granular, such that manual masking is unnecessary for different sizes of film and substrate.

In at least one embodiment, the system 400 may include one or more cameras 412 to monitor an operation table, a film belt sub-assembly, or both to establish the relative locations of a film and substrate. The processor 402 may utilize such locations to determine vacuum zones necessary to implement the lamination process.

In at least one embodiment, the processor 402 utilizes the identified locations to actuate a robotic arm 414 to move the film or substrate as necessary, or remove a liner to an adhesive portion of the film.

In at least one embodiment, a subset of the vacuum pumps 408 is dedicated to vacuum zones on an operation table for holding a rigid substrate. The operation table inverts during the lamination processes so the rigid substrate must be securely held to the operation table. Where the operation table includes a plurality of vacuum zones corresponding to the subset of vacuum pumps 408, the rigid substrate may be held without manual masking to maintain a vacuum at the desired location of the operation table.

Figure 5:
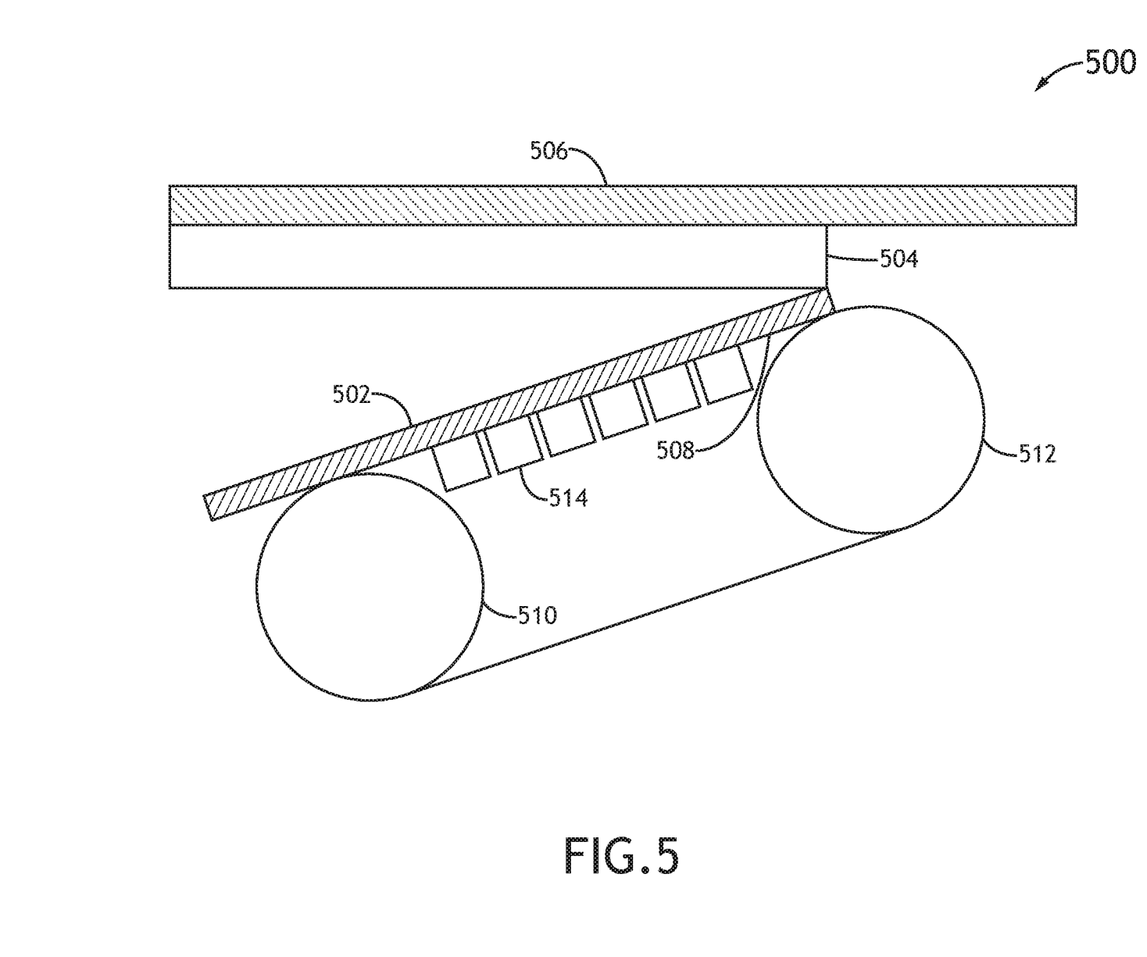
FIG. 5 shows a side view of a block representation of a lamination process according to an exemplary embodiment.

Referring to FIG. 5, a side view of a block representation 500 of a lamination process according to an exemplary embodiment is shown. Where a flexible film 502 is laminated to a rigid substrate 504, the rigid substrate 504 is disposed on an operation table 506 which may flip during the lamination operation and the flexible film 502 is held to a porous belt 508. The porous belt 508 is driven by rollers 510, 512 which may also apply a force to the flexible film 502 to facilitate bonding to the rigid substrate 504.

The flexible film 502 is held to the porous belt 508 via one or more vacuum zones 514 defined by a plurality of vacuum pumps or a system of internal, segregated vacuum structures supplied by a vacuum manifold. The vacuum zones 514 may be relatively stationary with respect to the flexible film 502 as the porous belt 508 moves by continuously adjusting the vacuum zones 514 or the manifold that distributes pressure differences to the one or more vacuum zones 514 to maintain neutral or slightly negative pressure. In at least one embodiment, the vacuum zones 514 may be adapted to apply positive pressure such that where the flexible film 502 and rigid substrate 504 first interface, a pressure may be applied to the flexible film 502 prior to a roller 510, 512 finishes the adhesion process.

In at least one embodiment, the vacuum zones 514 or manifold may be sufficiently granular to obviate the necessity of masking for differently sized films and substrates.

Figure 6:
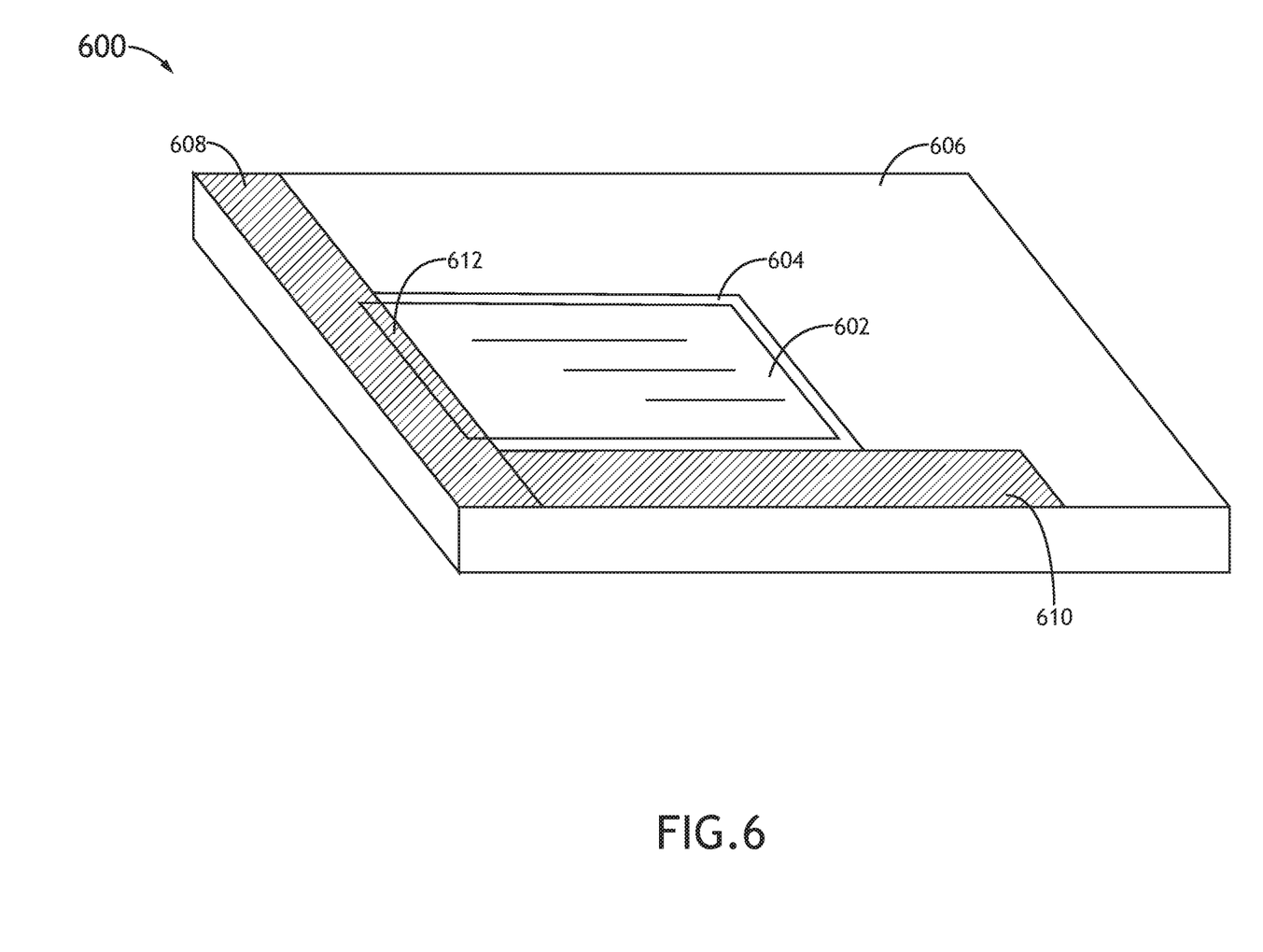
FIG. 6 shows a block representation of an operation table supporting a substrate according to an exemplary embodiment.

Referring to FIG. 6, a block representation 600 of an operation table 606 supporting a substrate 602 with a laminated film 604 according to an exemplary embodiment is shown. After a lamination process, a substrate 602 includes an adhered film 604. The substrate 602 may be positioned on the operation table 606 via one or more mechanical datums 608, 610. In at least one embodiment, the mechanical datums 608, 610 provide a surface that supports a leading edge of the film 604 during the lamination process such that the rollers that apply the force to facilitate lamination does not do not apply excessive force to the corresponding leading edge of the substrate 602. The mechanical datums 608, 610 may be Z-adjustable (adjustable in the Z dimension) with respect to the thickness of the substrate 602. The mechanical datums 608, 610 may be set at the same height as the substrate 602 so that the nip event occurs off the substrate 602 prevent crushing of the leading edge of the film 604, and the rolling process begins before the laminated film 604 contacts the substrate 602. Such structuring may be an advantage for preserving sensitive LCD cells. After the lamination process, the overlapping film portion 612 may be easily trimmed without damage to the substrate 602.

Figure 7:
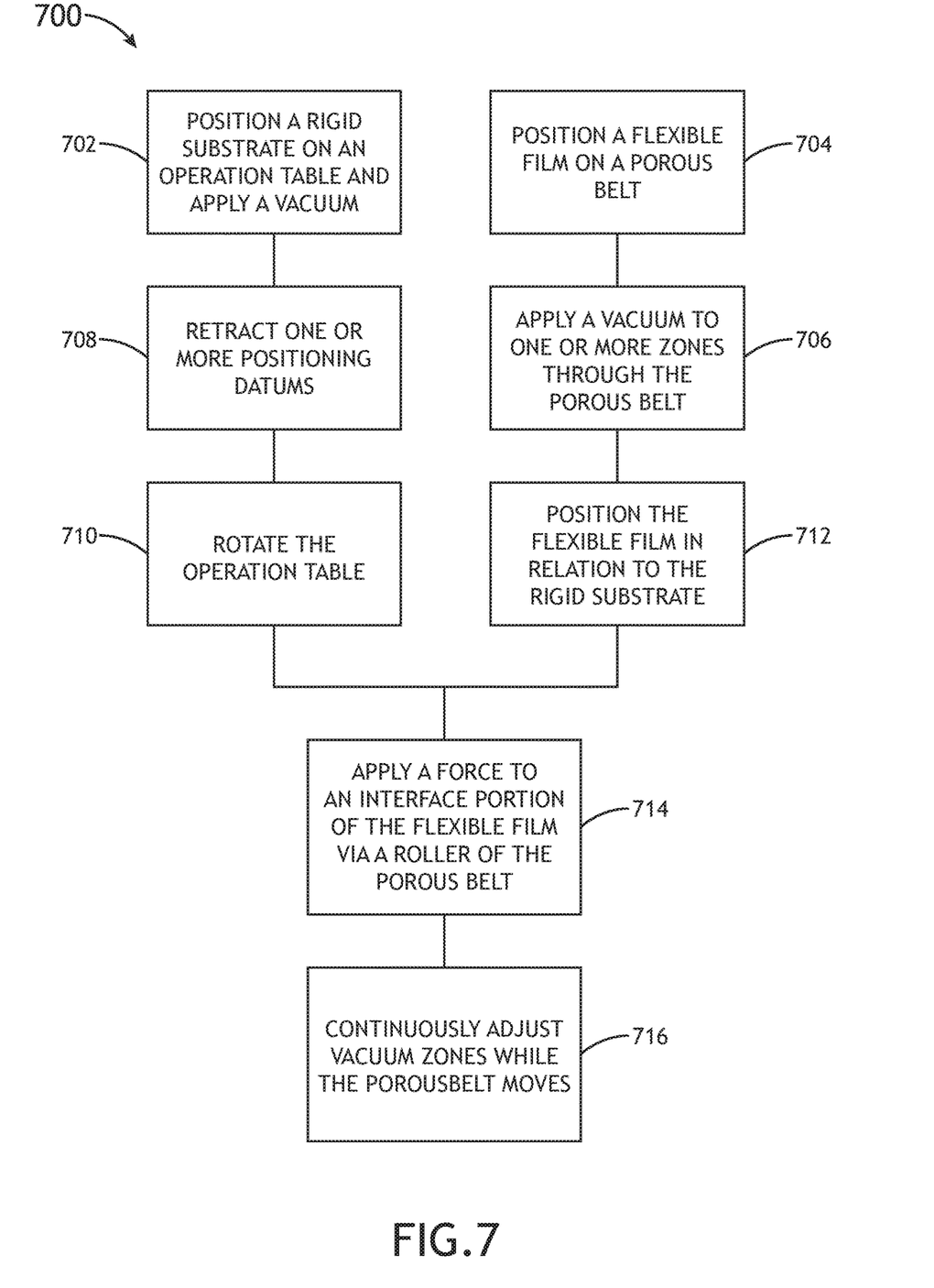
FIG. 7 shows a flowchart of a method for laminating a substrate according to an exemplary embodiment.

Referring to FIG. 7, a flowchart of a method 700 for laminating a substrate according to an exemplary embodiment is shown. A rigid substrate is positioned 702 on an operation table and a flexible film is positioned 704 on a porous belt of a porous belt assembly. In at least one embodiment, the substrate and flexible film may be positioned 702, 704 via a combination of identification via one or more cameras and one or more robot arms that position 702, 704 the components with respect to one or more datums. One positioned 702, the one or more datums are retracted 708.

The porous belt assembly applies 706 a vacuum to the flexible film to hold the flexible film at a desired location on the porous belt. In at least one embodiment, the operation table is rotated 710 or otherwise inverted and the flexible film is positioned 712 for adhesion with respect to the rigid substrate. It may be appreciated that other embodiments are envisioned; for example, the porous belt assembly may be inverted while the operation table remains stationary or transits linearly to a position corresponding to the flexible film.

With the porous belt assembly positioned 712 below the rigid substrate, the table tilts and a roller extends up to pinch the flexible film against the rigid substrate, then translates so that the flexible film is pulled up the vacuum table, past the roller, to apply 714 a force to press the flexible film onto the rigid substrate. As the rollers roll, the porous belt moves such that the flexible film nip line is maintained relatively stationary with respect to the rigid substrate. The vacuum zones are continuously adjusted 716 as the porous belt moves such that the pressure differential on the flexible film remains relatively stationary with respect to the flexible film until the film leaves the porous belt.

In at least one embodiment, one or more cameras may identify the locations of the flexible film and rigid substrate to align those elements during the lamination process by adjusting the location of the operation table, the porous belt assembly, or both. Furthermore, a robotic arm may work in conjunction with the cameras to position the flexible film, the rigid substrate, or both, and remove a protective liner covering an adhesive on the flexible film.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A system comprising:
   an operation table configured to hold a rigid substrate;
   a film belt assembly comprising:
      a vacuum table defining a plurality of vacuum zones;
      a porous belt disposed around the vacuum table;
      one or more positioning elements disposed and configured to adjust a position of the porous belt with respect to the operation table;
      at least two rollers disposed at opposing ends of the vacuum table;
      a drive motor configured to drive the porous belt around the vacuum table; and
      at least one vacuum pump configured to apply a pressure differential to each of the plurality of vacuum zones; and
   at least one processor in data communication with a memory storing processor executable code, an operation table motor configured to flip the operation table, the drive motor, the one or more positioning elements, and the at least one vacuum pump,
   wherein:
      each of the plurality of vacuum zones is configured to hold a flexible film at a defined location of the porous belt;
      the porous belt is configured to move the flexible film past at least one of the at least two rollers; and
      the processor executable code configures the at least one processor to:
         apply a vacuum to the rigid substrate on the operation table;
         apply a vacuum to a flexible film on the porous belt via the plurality of vacuum zones;
         flip the operation table;
         position the film belt assembly to align the rigid substrate and the flexible film via the one or more positioning elements;
         engage a portion of the flexible film to a portion of the rigid substrate; and
         drive the porous belt while contemporaneously translating the film belt assembly such that at least one roller of the film belt assembly presses the flexible film to the rigid substrate across the entire surface of the rigid substrate.

2. The system of claim 1, further comprising a plurality of blocking plugs within the vacuum table, each of the plurality of blocking plugs defining a width of one or more of the plurality of vacuum zones.

3. The system of claim 1, further comprising one or more linear actuator elements configured to translate the film belt assembly linearly along an axis defined by a direction of travel of the porous belt.

4. The system of claim 3, wherein the one or more linear actuator elements and drive motor are configured to move the flexible film past the at least one roller while relatively stationary with respect to the porous belt and a corresponding rigid substrate.

5. The system of claim 1, further comprising a manifold valve assembly connected to the at least one vacuum pump and the plurality of vacuum zones, wherein the manifold valve assembly is configured to adjust the pressure differential in the vacuum zones.

6. The system of claim 1, wherein the porous belt comprises a Teflon coating.

7. The system of claim 1, wherein the processor executable code further configures the at least one processor to drive the porous belt at a different speed than translating the film belt assembly to deliberately put the flexible film in either compression, tension, or a neutral state.

8. The system of claim 1, further comprising one or more datums configured to define the location of the rigid substrate, the one or more datums having an adjustable Z-height, wherein the one or more datums are set to a Z-height corresponding to a thickness of the rigid substrate and an initial portion of the flexible film is nipped on the one or more datums prior to engaging the portion of the flexible film to the portion of the rigid substrate.

* * * * *